United States Patent
Cracolici

(10) Patent No.: US 12,158,054 B2
(45) Date of Patent: Dec. 3, 2024

(54) APPARATUS AND METHOD FOR INJECTING A FLUID INTO THE WELL DURING DRILLING

(71) Applicant: ENI S.P.A., Rome (IT)

(72) Inventor: Federico Cracolici, San Donato Milanese (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/905,979

(22) PCT Filed: Mar. 11, 2021

(86) PCT No.: PCT/IB2021/052021
§ 371 (c)(1),
(2) Date: Sep. 9, 2022

(87) PCT Pub. No.: WO2021/181320
PCT Pub. Date: Sep. 16, 2021

(65) Prior Publication Data
US 2023/0013958 A1      Jan. 19, 2023

(30) Foreign Application Priority Data
Mar. 12, 2020   (IT) ........................ 102020000005386

(51) Int. Cl.
*E21B 33/14*   (2006.01)
*C09K 8/467*   (2006.01)
(Continued)

(52) U.S. Cl.
CPC .............. *E21B 33/14* (2013.01); *C09K 8/467* (2013.01); *E21B 23/01* (2013.01); *E21B 27/02* (2013.01)

(58) Field of Classification Search
CPC .......... E21B 33/14; E21B 27/02; C09K 8/467
See application file for complete search history.

(56) References Cited

U.S. PATENT DOCUMENTS

| 2,965,171 A | 12/1960 | Howard et al. |
| 5,533,570 A * | 7/1996 | Streich ............... E21B 27/02 166/333.1 |

(Continued)

FOREIGN PATENT DOCUMENTS

| CA | 2210287 C | 3/2006 |
| EP | 2128378 A1 | 12/2009 |
| WO | 9621794 A1 | 7/1996 |

OTHER PUBLICATIONS

International Search Report issued May 21, 2021 re: Application No. PCT/IB2021/052021; pp. 1-4, citing: WO 96/21794 A1, US 2006/0219407 A1, EP 2 128 378 A1 and US 2 965 171 A.

(Continued)

*Primary Examiner* — Catherine Loikith
(74) *Attorney, Agent, or Firm* — CANTOR COLBURN LLP

(57) ABSTRACT

An apparatus for injecting an accelerating fluid into an oil well includes a casing open at the ends into which a cement flows and positioned inside the well forming an annular zone with its walls. The casing includes a hollow cylindrical body with lateral surfaces integral with the casing internal surfaces and a central hole through which a cement flows, with a lower horizontal section than the casing section. The apparatus includes hollow internal chamber with an accelerating fluid; one or more body inlet devices, which put the body and chamber in fluid communication. The inlet devices are positioned on one of the hollow cylindrical body base surfaces. The apparatus includes at least one body outlet devices, which puts the chamber in fluid communication with the conduit through the central hole, positioned radially with respect to the cylindrical body axis and along the central hole internal surface.

14 Claims, 4 Drawing Sheets

(51) Int. Cl.
*E21B 23/01* (2006.01)
*E21B 27/02* (2006.01)

(56) References Cited

U.S. PATENT DOCUMENTS

| | | | |
|---|---|---|---|
| 5,544,705 A * | 8/1996 | Jones | E21B 27/02 |
| | | | 166/291 |
| 5,718,287 A | 2/1998 | Streich et al. | |
| 9,850,419 B2 * | 12/2017 | Ballew | B01F 27/091 |
| 2006/0219407 A1 | 10/2006 | Livingstone | |
| 2011/0042081 A1 | 2/2011 | Streich et al. | |
| 2011/0132606 A1 | 6/2011 | Demong et al. | |

OTHER PUBLICATIONS

Written Opinion issued May 21, 2021 re: Application No. PCT/IB2021/052021; pp. 1-6, citing: WO 96/21794 A1, US 2006/0219407 A1, EP 2 128 378 A1 and US 2 965 171 A.

* cited by examiner

APPARATUS AND METHOD FOR INJECTING A FLUID INTO THE WELL DURING DRILLING

TECHNICAL FIELD

The present disclosure is within the scope of the operations of Primary Well Cementing and Cement Plugs.

In particular, the present disclosure describes an apparatus and method for injecting a fluid into the well in order to accelerate the setting and hardening of a drilling cement. Said fluid is indicated in the present patent application as accelerating fluid.

In the present patent application, the base surface of an axialsymmetrical body, for example a cylinder body, is intended to mean the surface perpendicular to the axis of the cylindrical body.

In the present patent application, horizontal section of an axialsymmetrical body is intended to mean the plane section orthogonal to the axis of the body, also known as the section parallel to the first lying plane.

In the present patent application, all the operating conditions reported in the text must be understood as preferred conditions even if not expressly declared.

For the purposes of the present discussion the term "to comprise" or "to include" also comprises the term "to consist in" or "essentially consisting of".

For the purposes of the present discussion the definitions of the intervals always comprise the extreme values unless otherwise specified.

BACKGROUND

During drilling of an oil well it is common to use a cement both to bind the coating column (indicated as casing in the present patent application) to the geological formation of the relative section, and to obtain a hydraulic insulation between the crossed lithological layers and the inside of the well itself.

Cement layers are typically placed in a well in order to stop circulation losses or exclude lithological and productive levels.

To date, dedicated chemical additives (mainly mono- and bi-valent salts) are used to speed up the setting times of a drilling cement, which are mixed with the cement mortar on the surface before being pumped into the well. In this way, these additives accelerate the setting of the mortar, but they also negatively affect the injection times thereof when it is wished that they are as long as possible.

These chemical additives therefore contribute to the process of hydration of the cement as soon as they are mixed with the cement. To reduce the acceleration effect during the injection step, cement mortar is mixed with other additives which dampen the acceleration effect below certain temperatures, close to that of the well bottom temperature.

U.S. Pat. No. 5,718,287 describes an apparatus for casing cementing operations, and in particular it describes a device for injecting an accelerating fluid into the well at the most appropriate point or for maintaining the accelerating fluid at a given point in the well.

In general, the device provides a housing which contains a chamber in which the accelerating fluid, a communication door, valves and communication means are situated.

In one embodiment, the accelerating agent is introduced into the cement by means of a plug which releases the fluid, due to a differential pressure, at a certain instant so that it is injected only in a certain portion of the cement mortar.

Another option is that the accelerating agent is positioned in a casing portion so that it is maintained in a given position of the well. The differential pressure generated by the cement flow outside the casing causes the accelerating agent to outflow.

Us 2011/0042081 discloses devices for releasing a chemical additive in the annular zone comprised between casing and walls of an oil well. The casing can be provided with one or more activation collars positioned at several points, which can rotate or move axially. An overpressure breaks rupture discs or other breakable elements, and thus activates the collars releasing the accelerating additive in the annular zone.

In all the illustrated options the device has some elements coupled together: a housing is coupled to a casing, and to a tank containing the chemical additive. In this tank, pistons or tension sleeves can also be present which displace the fluid inside it.

The cement flows in the annular zone mixing with the accelerating additive.

US 2011/0132606 describes a device for the release of an accelerating additive, said device being positioned along the annular zone comprised between the casing and the walls of an oil well. The accelerating additive is released in a certain position and at a certain instant.

SUMMARY

The Applicant has therefore elaborated an apparatus for injecting a fluid into an oil well which has the function of accelerating the setting and hardening of a drilling cement (accelerating fluid in the present text) used during the cementing operations of a casing.

Said apparatus injects the accelerating fluid when the cement is in the zone of the well to be cemented, so that the setting and hardening step can take place during the step of rising of the cement in the annular zone comprised between the casing and the well walls.

The present patent application therefore relates to an apparatus for injecting an accelerating fluid into an oil well; said apparatus comprises a casing which is open at the ends into which a cement flows, said casing to be positioned inside the well forming an annular zone with its walls; said casing comprising in its inside a hollow cylindrical body whose lateral surfaces are integral with the internal surfaces of the casing;

said hollow cylindrical body being characterized by:
having a central hole through which a cement flows, with a horizontal section having a smaller cross-section than the casing section, open at both ends and as long as the cylindrical body;
comprising a hollow internal chamber which contains an accelerating fluid;
having one or more body inlet devices, which put said body in fluid communication with said chamber; said inlet devices being positioned on one of the base surfaces of the hollow cylindrical body;
having one or more body outlet devices, which put said chamber in fluid communication with the conduit through the central hole,
positioned radially with respect to the axis of said cylindrical body;
positioned along the internal surface of the central hole;
so that the accelerating fluid enters the hole through said devices and mixes with the drilling cement;
means for opening said chamber inlet and outlet devices.

A further embodiment according to the present disclosure is a method for accelerating the setting and hardening of a drilling cement which comprises the following steps:

inserting in an oil well a casing which internally includes a hollow cylindrical body whose lateral surfaces are integral with the internal surfaces of the casing;

said body being drilled centrally so as to allow a cement to flow in its inside;

said body having a hollow internal chamber which contains an accelerating fluid;

said body including one or more inlet devices positioned on one of the base surfaces of the hollow cylindrical body, which put said body in fluid communication with said chamber;

said body having one or more outlet devices which put said chamber in fluid communication with the conduit through the central hole, said devices being positioned radially with respect to the axis of said cylindrical body and positioned along the internal surface of the central hole;

injecting a cement inside the casing;

sending inside the casing from the well head opening means which have the function of opening the inlet devices of the hollow cylindrical body, so as to form openings that allow the cement to enter the internal chamber, to mix in part with the accelerating fluid and at the same time to move said accelerating fluid towards the outlet devices by opening them;

letting the mixture flow from the casing to the annular area.

A further embodiment according to the present disclosure is a method for accelerating the setting and hardening of a drilling cement which uses the apparatus described and claimed in the present patent application, and comprises the following steps:

injecting a drilling cement into a casing that includes a hollow cylindrical body;

opening one or more body inlet devices so that the cement can flow inside the chamber included in the body, mix with the accelerating fluid and at the same time move said accelerating fluid towards the outlet devices by opening them;

letting said mixture flow inside the casing towards the annular zone of the oil well.

Advantageously, the present disclosure allows the accelerating fluid to mix with a cement at the desired point inside the oil well. The accelerating fluid is able to accelerate the passage from the liquid phase to the solid phase, without causing the reduction of the injection times of the cement mortar. In fact, the cement would encounter the accelerating agent only in the final step of the injection, so that the process of acceleration of the setting and hardening takes place in the short time of rising of the cement in the annular section comprised between the duct (casing) and the inner walls of the well. Thanks to the present disclosure, the cement remains liquid longer during the resolution of criticality during the injection step (failure of the pumps, clogged surface lines), avoiding the solidification of the cement inside the drilling assembly or in the surface equipment.

Thanks to the present disclosure, the tail cement can set and harden more quickly, ensuring a greater safety in terms of well integrity, that is, there is a lower risk of channeling the cement and a lower risk of micro-annuli being created.

The known methods do not guarantee that the upper cement plug lands on the lower cement plug ("plug contact"), nor do they allow to understand when this contact occurs during the cementing operation, therefore, it is often not possible to know exactly which portion of cement mortar is in contact with the accelerating fluid.

The known methods can cause erosion of the fins in the cement plugs causing a lack of hydraulic tightness in the cement injection step, with consequent insufficient Venturi effect when the cement is mixed with the accelerating agent.

By using the known methods when the casing is eccentric with respect to the axis of the oil well, the Venturi effect may not be guaranteed astride the nozzles for the outflow from the casing, since the rise of the cement in the annular zone is not homogeneous along the whole path. When the accelerating agent is fed to the well head after injecting the cement, the accelerating agent could be distributed inhomogeneously because it is not always possible to rotate or swing the casing so as to allow an efficient distribution of the cement.

The systems according to the state of the art can favour the onset of torsion and dragging phenomena that could cause uncontrolled activation or breakage of the system for the release of the accelerating agent, especially in wells launched with a severe inclination of the well trajectory (dog leg severity).

Finally, the systems according to the state of the art, when they provide for the installation of devices in the walls of the casing, cause the reduction of the effective thickness reducing its resistance to fractures and collapse and negatively affecting the Well Integrity.

Some devices reduce the effective thickness of the sleeves as well as their resistance to fracture and collapse; others need appropriate certifications to avoid possible internal-external communication.

BRIEF DESCRIPTION OF THE DRAWINGS

Further aims and advantages of the present disclosure will appear more clearly from the following description and from the accompanying figures, given purely by way of a non-limiting example, which represent preferred embodiments of the present disclosure.

FIG. 1 shows in fact an oil well (1) in which a casing (2) is inserted. An annular zone (3) is created between the casing and the well walls. A hollow cylindrical body (4) which includes a chamber (5) in which the accelerating fluid is stored is positioned inside the casing, integral with the inner walls. The body has an open central hole (6) and closed inlet (7) and outlet (8) devices. The cement flows through the casing and the central hole; when the inlet devices are open, the cement flows into the body, moving the accelerating fluid contained therein, then the still liquid mixture of accelerating fluid and cement rises along the annular zone where the setting and hardening takes place.

DETAILED DESCRIPTION OF THE DRAWINGS

Figure 1:
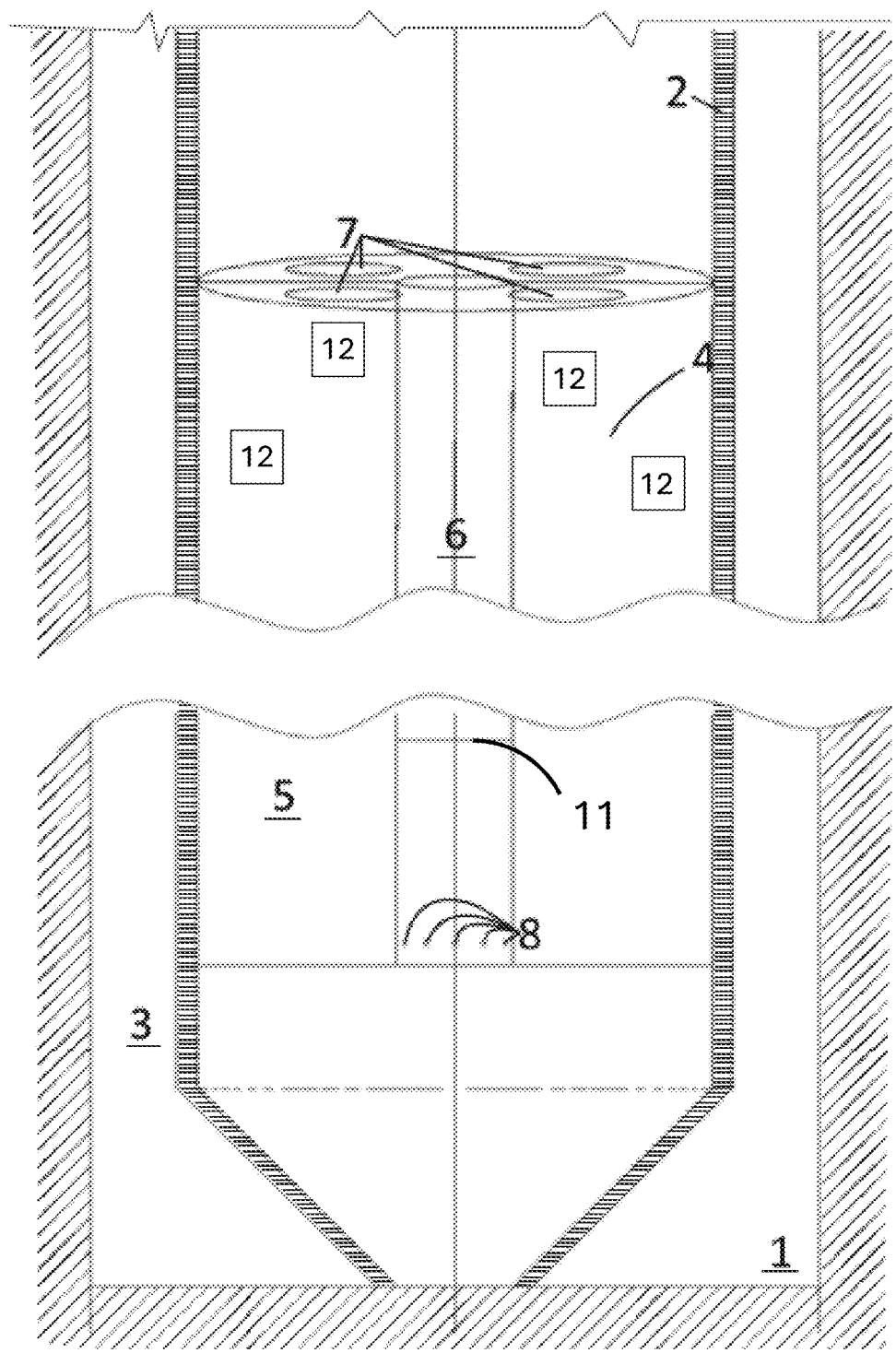
FIG. 1 shows a preferred embodiment of the present disclosure.

The disclosure object of the present patent application is now described in detail with reference to FIG. 1.

A casing (2) which is open at its ends forming an annular zone (3) with the well walls is inserted in an oil well (1). A cement can flow inside the casing.

Said casing comprises in its inside a hollow cylindrical body (4) whose lateral surfaces are integral with the internal surfaces of the casing. Said body may include a hollow internal chamber (5) which contains an accelerating fluid.

The body may include a central hole (6) with a horizontal section having a smaller cross-section (11) than the casing section, open at both ends and as long as the cylindrical body, through which cement can flow.

The body may include one or more body inlet devices (7), which put said body in fluid communication with said chamber; said devices may be symmetrically equidistant, but may also be in asymmetrical positions. Said devices are positioned on one of the base surfaces of the hollow cylindrical body, in particular on the base surface oriented toward the inlet of the well.

The body may include one or more body outlet devices (8), which put said chamber in fluid communication with the conduit through the central hole. Said outlet devices can be positioned symmetrically or asymmetrically, but always radially with respect to the axis of said cylindrical body; said outlet devices can also be positioned along the internal lateral surface of the central hole, so that the accelerating fluid enters the hole and mixes with the drilling cement. The inlet and outlet devices are normally closed, but they can be opened by suitable opening means sent inside the casing by the well head. Said opening means may preferably be activation means, more preferably selected from caps, pins or spheres; or with suitable devices that can be activated by overpressure such as for example the rupture discs; or sliding devices such as for example the slip surfaces. Once the inlet devices have been opened, the cement flows inside the hollow chamber, where it moves the accelerating fluid mixing with it, then it flows out through said outlet devices and flows into the annular zone. In this zone a turbulent motion is formed and the process of setting and hardening of the cement begins.

Inside said chamber there may be mechanical devices (12) which have the function of slowing down the leakage of the accelerating fluid, preferably selected from perforated plates with a passage area varying from 15% to 35% of open surface with respect to the total surface of the plate, or bulkheads. Said mechanical devices (12) can be arranged according to a staggered sequence inside the hollow chamber.

Preferably, the accelerating fluid is a mono-valent or bi-valent saline solution, preferably selected from chlorides, carbonates, silicates, aluminates, nitrates, nitrites, sulphates, thiosulfates and alkaline bases. More preferably, they are selected from sodium silicates, sodium hydroxides, potassium hydroxides, aluminium hydroxides.

The number of inlet devices can vary from 4 to 20, preferably from 6 to 18, more preferably from 8 to 16. The number of body outlet devices may vary from 12 to 20, preferably from 14 to 18.

Some application examples of the present disclosure are now described, which have a purely descriptive and non-limiting purpose and which represent preferred embodiments.

A further embodiment according to the present disclosure is a method for accelerating the setting and hardening of a drilling cement which uses the apparatus described and claimed in the present patent application, and which comprises the following steps:

injecting a drilling cement into a casing that includes a hollow cylindrical body;

opening one or more body inlet devices so that the cement can flow inside the chamber included in the body, mix with the accelerating fluid and at the same time move said accelerating fluid towards the outlet devices by opening them;

letting said mixture flow inside the casing towards the annular zone of the oil well.

An application example of the present disclosure is now described, which is for a purely descriptive and non-limiting purpose and represents a preferred embodiment.

Example 1

Example 1 shows the operation of an apparatus according to the present disclosure, which has the purpose of assessing the constant release over time of accelerating agent into a cement.

In example 1, a cylindrical hollow chamber, positioned in the end part of the well-bottom casing, is provided. The hollow chamber contains an accelerating agent.

Some holes are present on the upper base and on the internal lower lateral surface of the central hole; the cement enters the chamber from the upper base and pushes the accelerating agent through the lower holes into the flow of cement.

The flow of cement mixed with the accelerating agent then rises in the annular zone comprised between the well walls and the casing.

In order to better understand the mixing process, CFD (Computational fluid Dynamics) was used. Initially the problem was modelled as a 2d symmetrical axial, then a complete 3d model was made.

100 m of well were simulated; the diameter of the chosen well is 31.115 cm (12.25 inches), while the chosen casing has a diameter of 24.4475 cm (9.625 inches). The casing was simulated assuming a wall thickness equal to zero. The cylindrical hollow chamber has a height of about 11 meters, an internal diameter of 5.08 cm (2 inches), while its external wall corresponds to the internal diameter of the casing. The chamber volume is approximately 0.42 m$^3$ (420 l).

The inlet holes are 4, in addition to the central hole, and are arranged equidistant and symmetrically with respect to each other on the upper base of said chamber. The outlet holes are 12 with a diameter of 2 mm and are located at the end part of the lateral surface of the hollow chamber on its internal surface, spaced apart by 30°.

The non-Newtonian properties of the cement were taken into account.

3 working temperatures were simulated: 25° C., 50° C. and 70° C. The cement flow rate at which the simulation was carried out is 136.0777 kg/h (5 bbl/min).

The simulation ends with the cement that stops flowing (simulation of the landing of the upper plug on the lower plug) when the concentration of the accelerating agent in the chamber is lower than 0.01% by volume with respect to the volume of the chamber.

The main outputs of the simulation are the chamber emptying time and the axial distribution of the accelerating flow/cement in the annular zone.

Figure 2:
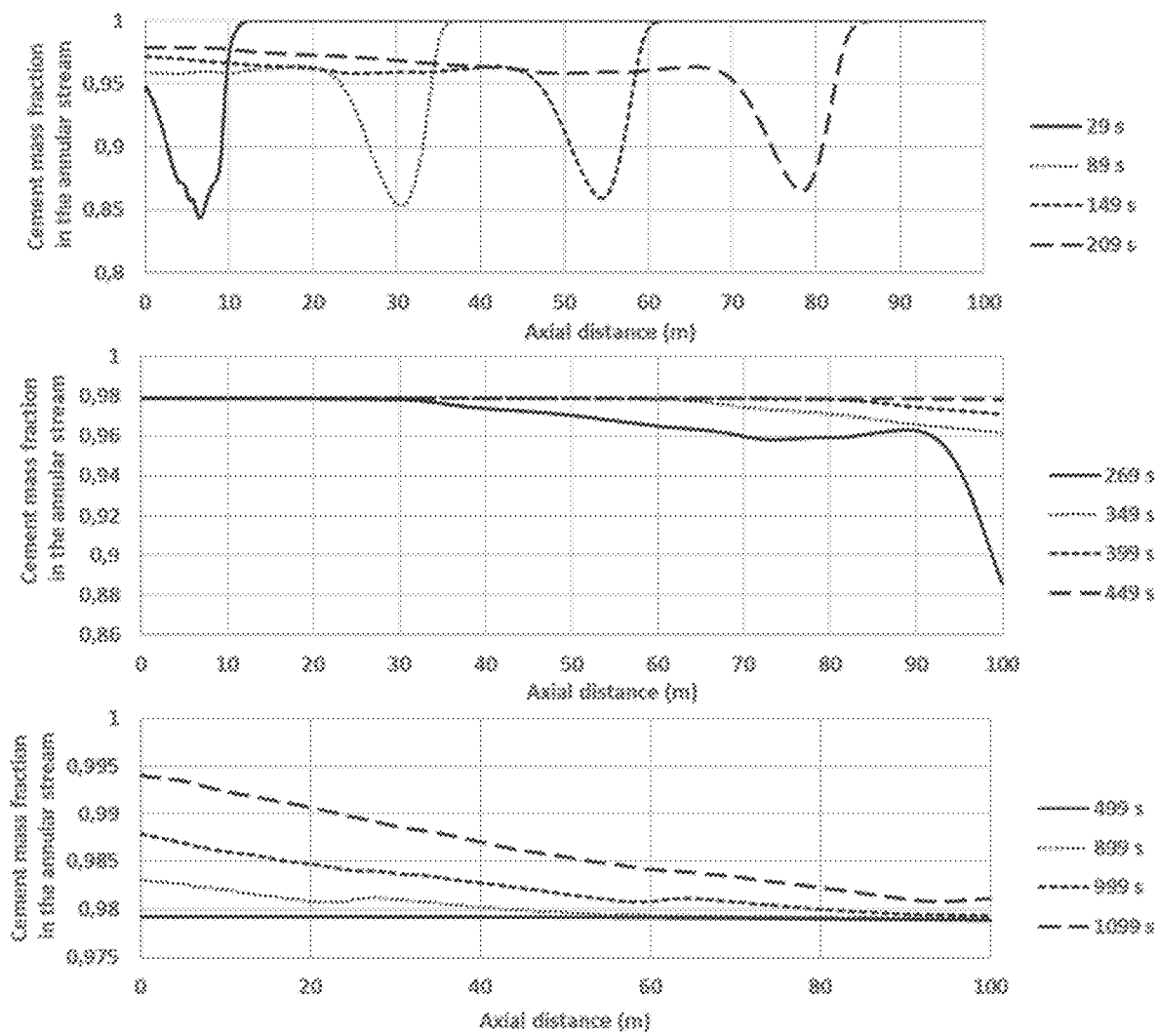
FIG. 2 shows the profiles of the mass fraction of the cement in the annular flow with respect to time, at 70° C. observed in the simulation of example 1.
Figure 3:
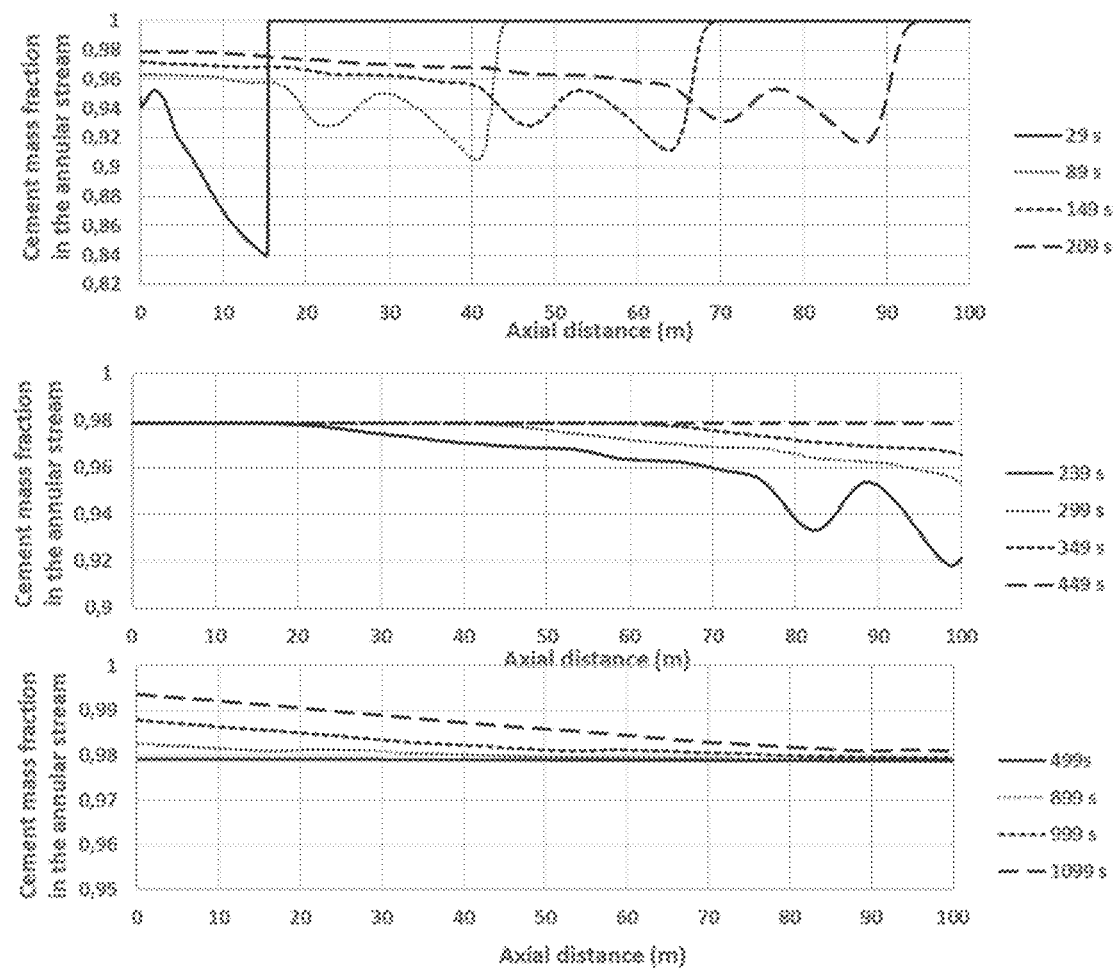
FIG. 3 shows the profiles of the mass fraction of the cement in the annular flow with respect to time, at 50° C. observed in the simulation of example 1.
Figure 4:
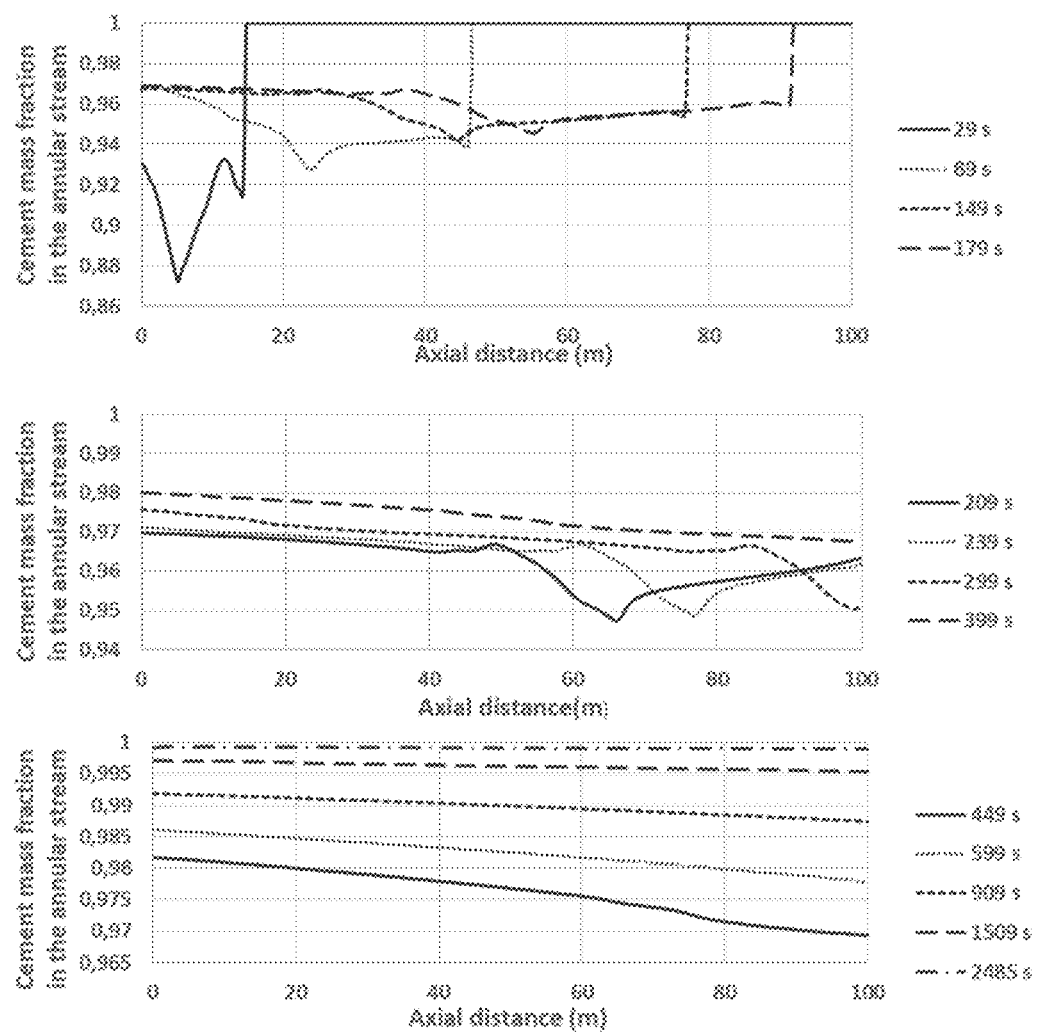
FIG. 4 shows the profiles of the mass fraction of the cement in the annular flow with respect to time, at 25° C. observed in the simulation of example 1.

By observing the diagrams of FIG. 2-4 it can be noted that the time for emptying the hollow chamber is about 20 minutes (40 minutes at 25° C.), in line with the actual times used for the well cementing operations with these well diameters and injection flow rates.

At 50° C. the results are similar to those at 70° C., whereas at 25° C. the chamber emptying time is much longer and the distribution of the accelerating agent in the cement flow is even better.

In all simulated cases, the concentration of accelerating agent in the cement is, with the exception of an initial starting point, rather homogeneous during the injection step, settling at a value of about 2% (value present within the range of addition of the accelerating agents into cement, currently in use).

The invention claimed is:

1. An apparatus for injecting an accelerating fluid into an oil well, said apparatus comprises:
   a casing which is open at ends into which a cement flows, said casing configured to be positioned inside the well forming an annular zone with its walls, said casing having an inside with a hollow cylindrical body whose lateral surfaces are integral with internal surfaces of the casing;
   said hollow cylindrical body comprising:
   a central hole through which a cement flows, with a horizontal section having a smaller cross-section than a casing section, open at both ends and as long as the cylindrical body;
   a hollow internal chamber which contains an accelerating fluid;
   one or more body inlet devices, which put said casing in fluid communication with said chamber, said inlet devices being positioned on one of base surfaces of the hollow cylindrical body; and
   one or more body outlet devices, which put said chamber in fluid communication with the casing through the central hole, positioned radially with respect to a longitudinal axis of said cylindrical body, positioned along an internal surface of the central hole;
   whereby the accelerating fluid enters the hole through said inlet devices and mixes with drilling cement; and
   further including opening means configured for opening said chamber inlet and outlet devices.

2. The apparatus according to claim 1, wherein said opening means are activation means, or devices that can be activated by overpressure, or sliding devices.

3. The apparatus according to claim 2, wherein the activation means are selected from the group consisting of caps, pins, and spheres; the devices configured to be activated by overpressure are rupture discs; and the sliding devices are slip surfaces.

4. The apparatus according to claim 1, wherein mechanical devices are disposed inside the hollow cylindrical chamber and are configured for slowing down leakage of the accelerating fluid.

5. The apparatus according to claim 4, wherein the mechanical devices are selected from the group consisting of perforated plates with a passage area varying from 15% to 35% of open surface with respect to the total surface of the plate and bulkheads.

6. The apparatus according to claim 5, wherein said mechanical devices are arranged according to a staggered sequence inside the hollow cylindrical chamber.

7. The apparatus according to claim 1, wherein the accelerating fluid is a mono-valent or bi-valent saline solution.

8. The apparatus according to claim 7, wherein the accelerating fluid is selected from the group consisting of chlorides, carbonates, silicates, aluminates, nitrates, nitrites, sulphates, thiosulphates, and alkaline bases.

9. The apparatus according to claim 8, wherein the accelerating fluid is selected from the group consisting of sodium silicates, sodium hydroxides, potassium hydroxides, and aluminum hydroxides.

10. A method for accelerating setting and hardening of a drilling cement, the method including:
    inserting in an oil well a casing which internally includes a hollow cylindrical body having lateral surfaces that are integral with internal surfaces of the casing,
    said body being drilled centrally so as to allow a cement to flow in its inside;
    said body having a hollow internal chamber which contains an accelerating fluid;
    said body including one or more inlet devices positioned on one of base surfaces of the hollow cylindrical body, which put said casing in fluid communication with said chamber;
    said body having one or more outlet devices which put said chamber in fluid communication with the casing through a central hole, said outlet devices being positioned radially with respect to a longitudinal axis of said cylindrical body and positioned along the an internal surface of the central hole;
    injecting a cement inside the casing,
    sending inside the casing from well head opening means configured for opening the inlet devices of the hollow cylindrical body, so as to form openings that allow the cement to enter the internal chamber, to mix in part with the accelerating fluid and at the same time to move said accelerating fluid towards the outlet devices by opening them, and
    letting the mixture flow from an the casing to the an annular area.

11. The method according to claim 10, wherein the accelerating fluid is a mono-valent or a bi-valent saline solution.

12. The method according to claim 11, wherein the accelerating fluid is selected from the group consisting of chlorides, carbonates, silicates, aluminates, nitrates, nitrites, sulphates, thiosulphates, and alkaline bases.

13. The method according to claim 12, wherein the accelerating fluid is selected from the group consisting of sodium silicates, sodium hydroxides, potassium hydroxides, and aluminum hydroxides.

14. A method for accelerating setting and hardening of a drilling cement which uses the apparatus according to claim 1, the method including:
    injecting a drilling cement into a casing that includes a hollow cylindrical body,
    opening one or more body inlet devices whereby the cement flows inside the chamber included in the body, mixes with the accelerating fluid, and at the same time moves said accelerating fluid towards the outlet devices by opening the outlet devices, and
    letting said mixture flow inside the casing towards the annular zone of the oil well.

* * * * *